C. A. KLEEMAN.
Lamp.
No. 3,068.
Reissued Aug. 4, 1868.
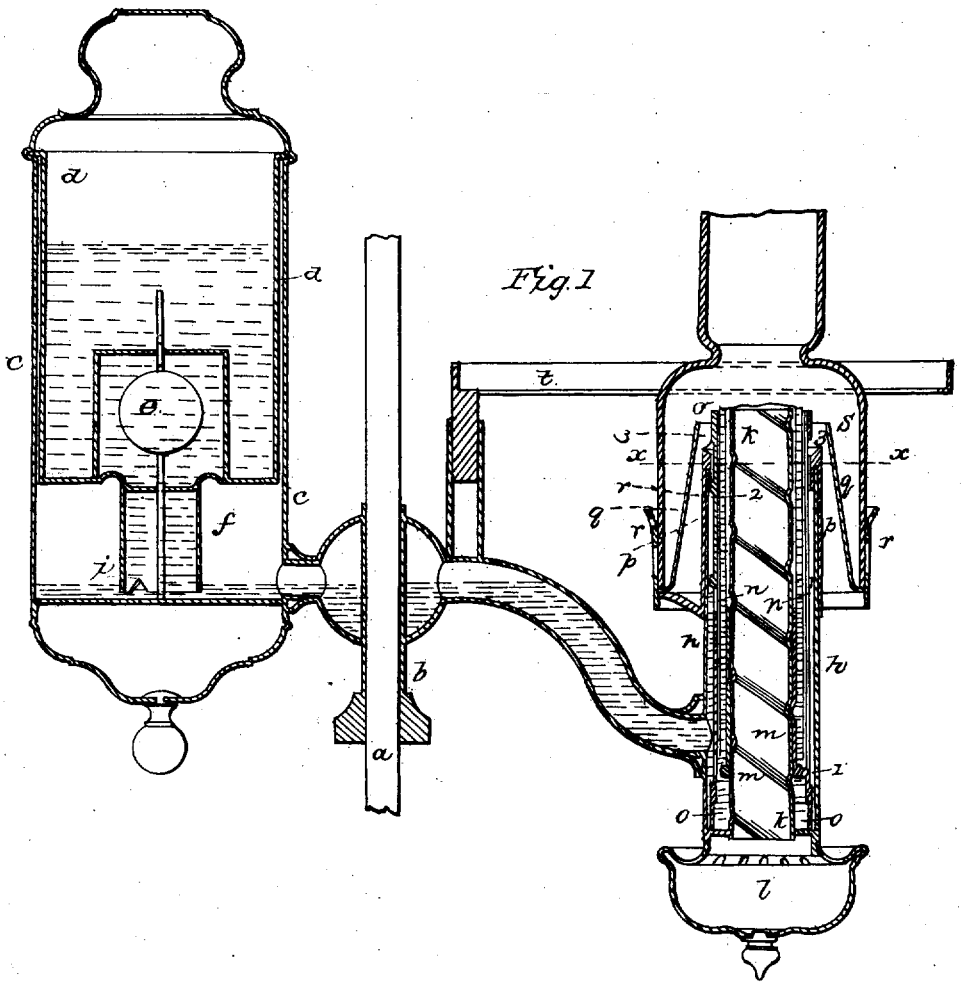
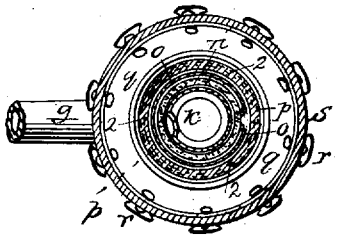
Witnesses
Emil Preuss
John L. Mottershead
Inventor
C. A. Kleeman
N. PETERS. Photo-Lithographer. Washington, D. C.

UNITED STATES PATENT OFFICE.

CARL A. KLEEMANN, OF ERFURT, PRUSSIA.

IMPROVEMENT IN LAMPS.

Specification forming part of Letters Patent No. 37,867, dated March 10, 1863; Reissue No. 3,068, dated August 4, 1868.

*To all whom it may concern:*

Be it known that I, CARL A. KLEEMANN, of Erfurt, in the Kingdom of Prussia, have invented, made, and applied to use a certain new and useful Improvement in Lamps; and I do hereby declare that the following is a full, clear, and exact description of my said invention, reference being had to the annexed drawing, making part of this specification, wherein—

Figure 1 is a vertical section of my said lamp; and Fig. 2 is a sectional plan of the burner at the line *x x*, Fig. 1.

Similar marks of reference indicate the same parts in both figures.

My invention relates to a lamp adapted to burning coal-oil, kerosene, or other oils, either pure or mixed with benzine or other material; and consists in an improved means for delivering the oil from the reservoir, and an improved burner adapted to burn the coal-oil without heating the lamp and without any risk of the oil overflowing.

In the drawing, *a* is a standard supported by any suitable pedestal; or said lamp may be sustained by any desired means. *b* is the sleeve on said standard *a*, clamped thereto by a screw, as usual. *c* is the reservoir, and *d* is the fountain, provided with the valve *e*, by which the fountain is closed while being inverted and entered into the reservoir, as usual. The cylinder *f* extends below the orifice for the valve *e*, and has a notch, *i*, at one side of said cylinder.

In the ordinary fountain-lamps the lower edge of this cylinder *f* is straight, and hence, as the oil burns down, a large sized bubble of air enters at the lower end of said cylinder, and the quantity of oil delivered causes the light to flicker. In the present instance the air passes in at this notch *i* in small bubbles, and much oftener, and thereby the light is not affected by the running down of the oil from the fountain.

*g* is a pipe leading from the reservoir *c* to the burner. *h* is the outer cylinder, and *k* the inner cylinder of the burner, united at their lower ends, and receiving the drip-cup *l*. The inner cylinder *k* is made of sheet metal, and the screw therein is made by bending or compressing said sheet metal instead of cutting said screw-thread in the metal. The object of this is to get the metal of the burner as thin and light as possible, in order that it may keep cooler, and not conduct heat down to the coal or similar oil.

Around the tube *k* is the wick-holder *m*, carrying the wick *n*, and this holder *m* takes the screw-thread in *k* so as to raise or lower the wick by the rotation thereof. *o* is a cylinder outside the wick, with a slot taking the projection 1 from *m*, whereby said wick-holder *m* is rotated. *p* is a cylinder outside of *h*, and connected with the cylinder *o*.

I have shown the cylinder *p* as extending, at the top end, slightly down inside the cylinder *h*, and notched to take the projections 2 2 for rotating the cylinder *o*. At the top of this tube *p* is a flaring or cup-shaped receptacle, 3, that catches any oil that may run down outside of the wick-tube *o*, and returns the same to the lamp and prevents any overflow.

The cylinder *p* is connected by arms 5 to the chimney-holder *r*, that carries the chimney *s*, and a cone, *q*, between the chimney and tube *p*, directs the air to the base of the flame. Around the base of the cone *q* are openings at 4, that allow a current of air to pass in between the cone *q* and chimney *s*, to aid in keeping these parts cool, and to supply air to the upper part of the flame.

This burner does not become heated to any considerable extent, because the thin sheet metal of which it is composed is largely exposed to the action of the air, and the cylinder *p* forms a connection between the chimney-holder *r* and tube *o* that does not obstruct the air as it ascends to the flame through the cone *q*; hence the flame is much more uniform than in the lamps where the chimney-holder is suspended by rods.

What I claim, and desire to secure by Letters Patent, is—

1. An Argand burner and chimney-holder, in combination with the cone *q*, provided with openings 4 to admit air to pass in between the cone and the glass chimney, substantially as set forth.

2. The cone *q*, provided with air-openings 4, in combination with the cylinder *p*, and arms 5, for connecting the said cone to the Argand burner, substantially as set forth.

3. The cup 3, in combination with the cylinder *p* and wick-tube *o*, as and for the purposes set forth.

In witness whereof I have hereunto set my signature this 30th day of January, A. D. 1868.

Witnesses: C. A. KLEEMANN.

FRANZ KERST,

F. GRANT CRAMER.